US006473749B1

(12) United States Patent
Smith et al.

(10) Patent No.: US 6,473,749 B1
(45) Date of Patent: Oct. 29, 2002

(54) SYSTEM AND METHOD FOR MANAGING FILE CONTENT

(76) Inventors: Robert Scott Smith, 2605 SW. Murray Dr., Oklahoma City, OK (US) 73119; Dale Penndorf, 12601 N. Penn, #182, Oklahoma City, OK (US) 73120; Jason McMinn, 113 NW. 13th, #204, Oklahoma City, OK (US) 73103; Thomas Mathew, 118 Bardwell Dr., Allen, TX (US) 75002; Doug Wilson, 806 Pebblebrook Dr., Allen, TX (US) 75002

( * ) Notice: Subject to any disclaimer, the term of this patent is extended or adjusted under 35 U.S.C. 154(b) by 0 days.

(21) Appl. No.: 09/510,699

(22) Filed: Feb. 22, 2000

(51) Int. Cl.[7] .............................. G06F 17/00; G06F 7/00
(52) U.S. Cl. .......................................................... 707/2
(58) Field of Search .................... 707/1–10, 100–104.1; 345/700

(56) References Cited

U.S. PATENT DOCUMENTS

| | | | | |
|---|---|---|---|---|
| 5,404,435 A | * | 4/1995 | Rosenbaum | 707/515 |
| 5,497,489 A | * | 3/1996 | Menne | 707/1 |
| 5,845,278 A | * | 12/1998 | Kirsch et al. | 707/1 |
| 5,963,965 A | * | 10/1999 | Vogel | 707/3 |
| 5,978,847 A | * | 11/1999 | Kisor et al. | 709/226 |
| 6,038,610 A | * | 3/2000 | Belfiore et al. | 709/203 |
| 6,253,208 B1 | * | 6/2001 | Wittgreffe et al. | 705/14 |

* cited by examiner

Primary Examiner—Jack Choules
Assistant Examiner—Pham Linh

(57) ABSTRACT

A system for managing file content, such as Microsoft Powerpoint for Windows™ presentation slides, is provided. The system includes an upload interface that can receive files, such as a file containing slides, from an upload client. The upload interface can extract data structures, such as slides or images, from each file, and index data from each data structure. The system also includes an index system that is connected to the upload interface. The index system can receive the index data from the upload interface and store the index data. A content storage system connected to the upload interface and the index system can receive data structures for storage from the upload interface system, and can provide a storage address for locating each data structure to the index system. A download interface is connected to the content storage system, and can be used to identify data structures matching a query and to download the data structures to a download client.

20 Claims, 3 Drawing Sheets

SYSTEM AND METHOD FOR MANAGING FILE CONTENT

FIELD OF THE INVENTION

The present invention pertains to the field of data management systems. More specifically, the invention relates to a system and method for managing file content that allows sub-file data structures, such as individual presentation slides, web pages, images, other suitable content, or suitable combinations of such data structures, to be submitted by content authors and searched by content users.

BACKGROUND

Data management systems are used to facilitate and control access to and maintenance of large quantities of data. Although modern digital technology allows vast quantities of data to be stored in a small volume, accessing and maintaining that data can be problematic. Presently, data is typically organized in files that can range in size from several kilobytes of digital data to megabytes or gigabytes of digital data.

In order to manage file data, existing data management systems index each file, and allow searching of content on a file-by-file basis. Some data management systems also include functionality to allow user-provided keywords to be manually associated with each file, and to associate user data with each file.

One drawback of these known data management systems is that they are file-based. Because the amount of data in a given file might exceed limitations of the indexing functionality of such data management systems, these known data management systems might be unable to index large numbers of large files. In addition, known data management systems do not allow a user to directly identify data structures within a large file, such as individual slides, images, web pages, or other suitable data structures. Instead, the user must first open the file, then perform a search of the data within the file. The user must then "cut and paste" portions of the file to another document.

The limited flexibility of existing data management systems limits the types of processes and functions that can be provided. As a result, many types of functionality that such programs can not provide are not apparent to users of such data management systems.

SUMMARY OF THE INVENTION

In accordance with the present invention, a system and method for managing data are provided that overcome problems of known systems and methods for managing data.

In particular, a system and method for managing file content are provided that allow content authors to store data structures from a file in a data repository or structured storage. Content users may then perform searches to identify individual sub-file data structures, and may withdraw individual sub-file data structures without editing the file.

In accordance with an exemplary embodiment of the present invention, a system for managing file content, such as Microsoft PowerPoint for Windows™ presentation slides, is provided. The system includes an upload interface that can receive a file containing a sub-file data structure, such as a file containing one or more slides, from an upload client. The upload interface extracts index data from each sub-file data structure. The system also includes an index system that is connected to the upload interface. The index system can receive the index data from the upload interface and store the index data. A content storage system connected to the upload interface and the index system can receive sub-file data structure content for storage from the upload interface system, and can provide a storage address for locating each data structure to the index system. A download interface is connected to the index system and the content storage system, and can be used to identify data structures matching a query and to download the data structures to a download client.

The present invention provides numerous important technical advantages. One important technical advantage of the present invention is a system for managing file content that allows file content authors to store sub-file data structures in a centralized location, and that also allows file content users to readily search and access the stored data structures so as to assemble files from the sub-file data structures on demand. The present invention thus provides a direct interface to individual slides, images, web pages, other suitable content, or suitable combinations of such data structures, without requiring the user to manually open individual files, extract individual data structures, and assemble them into a new document.

Those skilled in the art will further appreciate the advantages and superior features of the invention together with other important aspects thereof on reading the detailed description that follows in conjunction with the drawings.

DETAILED DESCRIPTION OF PREFERRED EMBODIMENTS

Figure 1:
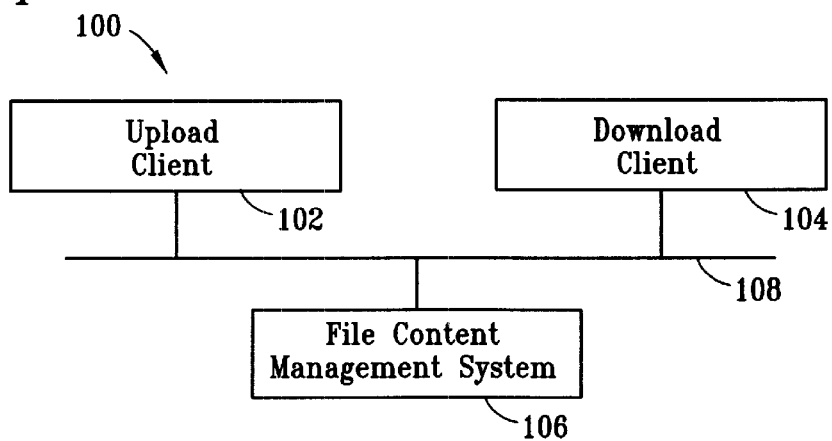
FIG. 1 is a diagram of a system for managing file content in accordance with an exemplary embodiment of the present invention.

In the description which follows, like parts are marked throughout the specification and drawing with the same reference numerals, respectively. The drawing figures may not be to scale and certain components may be shown in generalized or schematic form and identified by commercial designations in the interest of clarity and conciseness.

FIG. 1 is a diagram of a system 100 for managing file content in accordance with an exemplary embodiment of the present invention. System 100 may be used to allow content authors and content users to access file content, such that content authors may provide files containing one or more sub-file data structures and content users may locate desired file content from one or more of such files and assemble the data structures into a suitable configuration in a quick and efficient manner. For example, system 100 may be used by an organization to manage the content of slides used in presentations, web pages that are used on a website, photographs, graphic images, word processor documents, other suitable content, or suitable combinations of such data structures.

System 100 includes upload client 102. Upload client 102 may be implemented in hardware, software, or a suitable combination of hardware and software, and may be one or more software systems operating on a general-purpose client computing platform. As used herein, a software system may be implemented as one or more separate lines of code of a software program, one or more subroutines, one or more agents, one or more objects, one or more lines of code operating on different computing platforms, or other suitable software functionality. For example, a software system may include functionality that is provided by the operating system of the computing platform, plus other application-specific functionality.

Upload client 102 may be operable to generate and edit file content. In one exemplary embodiment, upload client 102 includes a slide presentation software package such as Microsoft PowerPoint for Windows™, such that the user of upload client 102 can design slide presentations by arranging and editing the content of slides. In this embodiment, the user of upload client 102 may be an employee in a marketing department of an enterprise that is tasked with providing up-to-date slide content describing products produced by the enterprise. Upload client 102 may be used to develop the slides, and to edit existing slides so as to provide up-to-date content for use by others.

Alternatively, upload client 102 may be other suitable file content creation and editorial systems. For example, upload client 102 may be used to generate web page product data or news stories that will ultimately be accessed through a search engine, news server, or other suitable gateway. In this exemplary embodiment, upload client 102 may be used by an employee of a news organization to create a web page news story. In yet another exemplary embodiment, upload client 102 may be used by an employee of a graphic image service, such as a photograph or drawing service. The employee may generate or modify graphic images for use by others.

System 100 also includes download client 104. Download client 104 may be implemented in hardware, software, or a suitable combination of hardware and software, and may be one or more software systems operating on a general-purpose client computing platform. Download client 104 is operable to receive data structures, to view the data structures, and to assemble the data structures to form a file. For example, download client 104 may be a general purpose slide presentation software package such as Microsoft PowerPoint for Windows™, which in addition to having functionality for viewing and presenting file content, has additional functionality that is not required for download client 104, such as to edit and create file content.

In another exemplary embodiment, download client 104 may be a server application for a news agency that presents web page content to users in accordance with predetermined templates. In this exemplary embodiment, download client 104 may include a template for sports news, with subheadings for baseball news, football news, hockey news, and other suitable categories. Download client 104 may be operable to receive file content for news stories in these headings and to store hyper-text links to the file content under the predetermined template format headings. In this embodiment, create and edit functionality might not be provided for download client 104.

In yet another exemplary embodiment, download client 104 may be a slide show software system that is used to generate screen images for mass viewing. Download client 104 may be used by a sales person of an enterprise to present information to existing or potential customers. In this exemplary embodiment, the user of download client 104 may select pre-designed slides for a presentation based upon the makeup of the audience, sales or specials that are being featured at that time, or other suitable criteria.

System 100 also includes file content management system 106. File content management system 106 may be implemented in hardware, software, or a suitable combination of hardware and software, and may be one or more software systems 8 operating on a general-purpose server computing platform. File content management system 106 is coupled to upload client 102 and download client 104 through communications medium 108. As used herein, the term coupled and its cognate terms, such as couple and coupling, may refer to a physical connection (such as a copper conductor), a logical connection (such as through logical devices of a semiconducting circuit), a virtual connection (such as through randomly-assigned memory locations of a data storage device), other suitable connections, or combinations of such connections. For example, two systems may be coupled through an intervening system, such as an operating system for the computing platform on which the systems operate. Communications medium 108 may be a suitable communications medium such as the Internet, the public switched telephone network, a local area network, a wide area network, a fiber optic conductor, a coaxial conductor, a twisted copper conductor, wireless communications media, or other suitable communications media.

File content management system 106 may be operable to receive data structures from upload client 102, and to provide the data structures on demand to download client 104. For example, file content management system 106 may receive a file containing one or more data structures from upload client 102. File content management system 106 then separates individual data structures from the file, processes each data structure to extract index data and summary data (such as thumbnail images), stores the index data, and stores the data structure in a repository or structured storage. In this manner, the index data may be searched to locate a suitable data structure by a user of download client 104. File content management system 106 may also receive user-provided data for each file and data structure, such that a pre-arranged presentation or sequence of data structures may be designated by the content author, so as to allow the original file structure to be re-created if desired.

File content management system 106 may also provide additional functionality for managing file content, where suitable. For example, file content management system 106 may control access to file content based upon the security level of the user providing or accessing the file content. A user of upload client 102 may seek to store information on file content management system 106, but may not have suitable security access for submitting that information. In this exemplary embodiment, the information being stored by file content management system 106 may relate to mergers and acquisitions, and it may be desirable to prevent a user of upload client 102 from storing such information if they do not have a suitable security access level.

Likewise, a user of download client 104 may require information on a restricted topic, and that user might not have a security access level sufficient to view the information. File content management system 106 may be configured to determine the security level of the user and the file content, so as to prevent users having an insufficient security level from storing or accessing data structures having a higher security access.

File content management system 106 may also track charge and credit information for each data structure. For example, the user of upload client 102 may be an author or other similar user that creates file content on a fee basis. Likewise, the users of download client 104 may be purchasers of such content. In another exemplary embodiment, the user of upload client 102 and the user of download client 104 may both be employed by the same enterprise, and the charge system may be used to allocate marketing, research, engineering or other charges to products, customers, projects, or other suitable cost-tracking categories. File content management system 106 may be configured to track such charge and credit data so as to allow tracking of overhead costs.

In operation, system 100 is used to manage file content for suitable applications. Upload client 102 may be used to generate file content, such as presentation slides, web pages, graphic images, other suitable content, or suitable combinations of such data structures. Upload client 102 may then provide files having one or more data structures to file content management system 106. File content management system 106 may be operable to extract index data, and to receive additional index data from the user of upload client 102 where suitable. File content management system 106 can also track cost data for each corresponding data structure, security data for each data structure, and other suitable data.

A user of download client 104 may then access file content management system 106 in order to select data structures having desired content. For example, download client 104 may be used to create a slide presentation for a marketing organization. Likewise, download client 104 may be used to assemble website content, graphical image content, or other suitable file content. In this matter, system 100 allows multiple users of upload clients 102 and download clients 104 to access data structures in a manner that is controlled and efficient.

Furthermore, file content management system 106 allows data structures to be controlled so that outdated information is not provided to persons that are not in a position to realize that the information is outdated. For example, users of upload client 102 may periodically review data structures stored on file content management system 106, so as to delete or edit the data structures having outdated information. This information may include price information, news content, or other suitable information that may become stale or outdated. In this manner, file content management system 106 may be used by an enterprise or other organization to control file content so that outdated or incorrect file content is not disseminated to other persons in the enterprise that are not in a position to know that the content is outdated.

Figure 2:
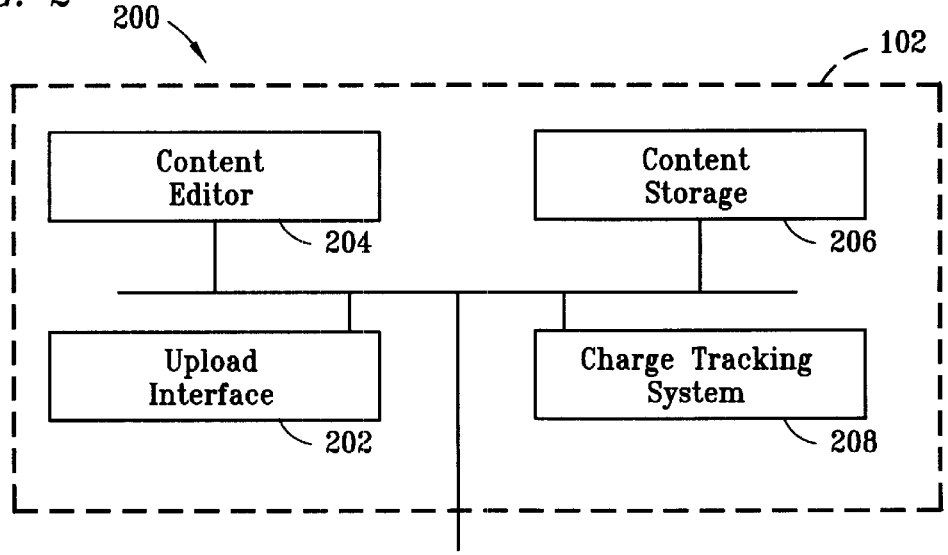
FIG. 2 is a diagram of a download client system in accordance with an exemplary embodiment of the present invention.

FIG. 2 is a diagram of an upload client system 200 in accordance with an exemplary embodiment of the present invention. Upload client system 200 may be implemented with upload client 102 and additional system functionality.

Upload client system 200 includes upload interface 202, content editor 204, and charge tracking system 208, each of which may be implemented in hardware, software, or a suitable combination of hardware and software, and which may be one or more software systems operating on upload client 102. For example, upload interface 202, content indexer 204, and charge tracking system 208 may be components of a single software system or individual software systems that are configured to interface with each other. Upload interface 202, content editor 204, content storage 206, and charge tracking system 208 are coupled through a suitable connection, such as an operating system of the computing platform on which the systems operate.

Upload interface 202 may be operable to interface with file content management system 106 over communications medium 108. Upload interface 202 may be an HTML software program downloaded from file content management system 106 such as through a web browser or other software system.

Upload interface 202 may be operable to allow a user to log on to file content management system 106, to identify content in content storage 206 for transfer to file content management system 106, or to perform other suitable functions. Upload interface 202 is also operable to receive charge or credit data from file content management system 106 and to store the charge or credit data in charge tracking system 208.

Content editor 204 may be operable to perform content creation and editing, and may be a slide presentation software package such as Microsoft PowerPoint for Windows™, a word processing package, a photograph image editor, or other suitable content editors. Content editor 204 is used to create file content. For example, a user may create slide presentation pages that describe products or services offered by an organization. Likewise, a user may use content editor 204 to create web pages, image pages, other suitable content, or suitable combinations of such data structures. The user may then store the file content in content storage 206.

In addition, the user may implement content editor 204 to retrieve a data structure from content storage 206, to modify the data structure, and to store the modified data structure in content storage 206. Likewise, content editor 204 may receive a data structure from file content management system 106, may modify the data structure, and may transfer the data structure back to file content management system 106 through upload interface 202.

Content storage system 206 may be implemented in hardware or a suitable combination of hardware and software, and may be a hard drive data storage mechanism. Content storage 206 may be operable to receive file content from content editor 204 in a suitable format, such as a file containing one or more data structures, and to store the file content in a non-volatile memory. Content storage 206 is also operable to controllably retrieve the file content in response to commands received from content editor 204, upload interface 202, or other suitable systems.

Charge tracking system 208 may be operable to track credits for data structures submitted or charges for data structures selected from file content management system 106. For example, charge tracking system 208 may be used to assign a charge for each data structure created by a user of content editor 204, such that when the data structures are uploaded to file content management system 106, the charge for each data structure is transmitted to file content management system 106. Likewise, file content management system 106 may generate charge data when data structures are accessed by a user of a download client 104 from file content management system 106, which may transmit the charge data for such data structures to charge tracking system 208. In this manner, a user of upload client 102 that authors file content may access charge tracking system 208 in order to determine the current charges assigned for various data structures, charges accumulated by users of download client 104, and other suitable charge data. Charge tracking system 208 may also be implemented in HTML code that is downloaded from file content management system 106 and operated by a suitable system, such as a web browser system.

In operation, upload client system 200 may be used to create, edit, and upload file content for use by users of download client 104. Upload client system 200 provides functionality for creating and editing file content and for tracking charges associated with the file content. In addition, content editor 204 may receive security data from the user when the content is edited such that the user is prevented from creating content having a security rating higher than the user's security rating. Alternatively, the user may be allowed to access file content based upon the security rating of the upload client 102 being used by the user.

Figure 3:
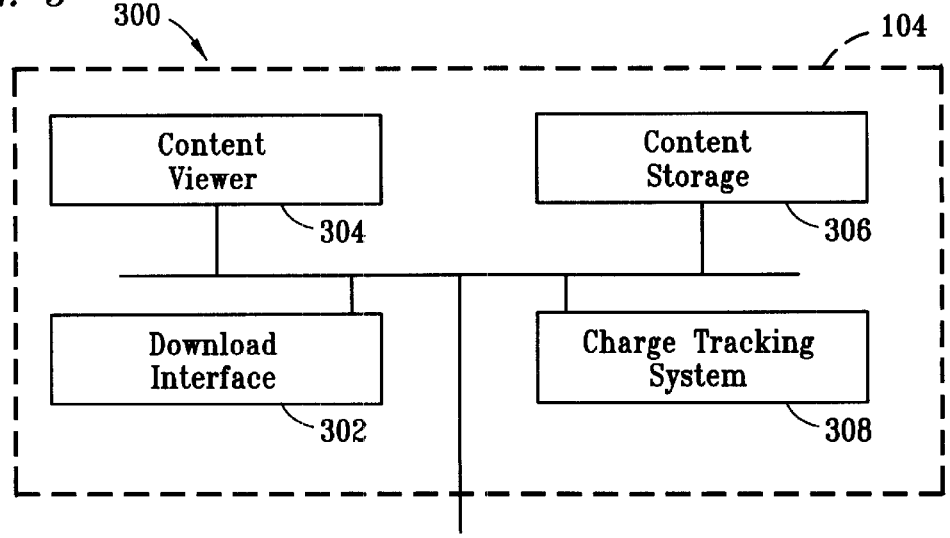
FIG. 3 is a diagram of an upload client system in accordance with an exemplary embodiment with the present invention.

FIG. 3 is a diagram of a download client system 300 in accordance with an exemplary embodiment of the present invention. Download client system 300 may be implemented with download client 104 and additional system functionality.

Download client system 300 includes download interface 302, content viewer 304, and charge tracking system 308, each of which may be implemented in hardware, software, or a suitable combination of hardware or software. For example, download interface 302, content viewer 304, and charge tracking system 308 may be components of a single software system or individual software systems that are configured to interface with each other. Download interface 302, content viewer 304, content storage 306, and charge tracking system 308 are coupled through a suitable connection, such as an operating system of the computing platform on which the systems operate.

Download interface 302 may be operable to interface with file content management system 106 over communications medium 108. Download interface 302 may be an HTML software program downloaded from file content management system 106 such as through a web browser or other software system. Download interface 302 may be operable to allow a user to log on to file content management system 106 and to search data structures stored by file content management system 106. The user may then transfer the data structures from file content management system 106 to content storage 306, or may perform other suitable functions. Download interface 302 is also operable to receive charge data from file content management system 106, and may present the user with the option of purchasing data structures where suitable.

Content viewer 304 is a file content viewing system, and may include file content editing and viewing capability. For example, content viewer 304 may be a slide presentation software package such as Microsoft PowerPoint for Windows™, a word processing package, a photograph image editor, or other suitable content editors. Content viewer 304 is used to view or otherwise utilize file content. For example, a user may assemble a slide presentation for making a sales presentation to an organization. Likewise, a user may use content viewer 304 to manage web-site content, graphical images, or for other suitable purposes. The user may store the file content in content storage 306 for these or other purposes.

Content storage system 306 may be implemented in hardware or a suitable combination of hardware and software, and may be a hard drive data storage mechanism. Content storage system 306 may be operable to receive file content in a suitable format, such as a file containing one or more data structures, and to store the file content in a non-volatile memory. Content storage system 306 is also operable to controllably retrieve the file content in response to commands received from content viewer 304 or other suitable systems.

Charge tracking system 308 may be operable to track charges for data structures selected from file content management system 106. For example, charge tracking system 308 may be used to tally charges for each data structure downloaded by a user of content viewer 304, such that when the data structures are downloaded from file content management system 106, the charge for each data structure is received from file content management system 106 and a running total is kept. Charge tracking system 208 may also be implemented in HTML code that is downloaded from file content management system 106 and operated by a suitable system, such as a web browser system.

In operation, download client system 300 is used to search for data structures stored at a file content management system 106. Download client system 300 provides functionality for searching and previewing data structures and for tracking charges associated with each data structure. Download client system 300 may be used to assemble slide presentations, web page content, graphic image content or sequences, other suitable content, or suitable combinations of such data structures.

Figure 4:
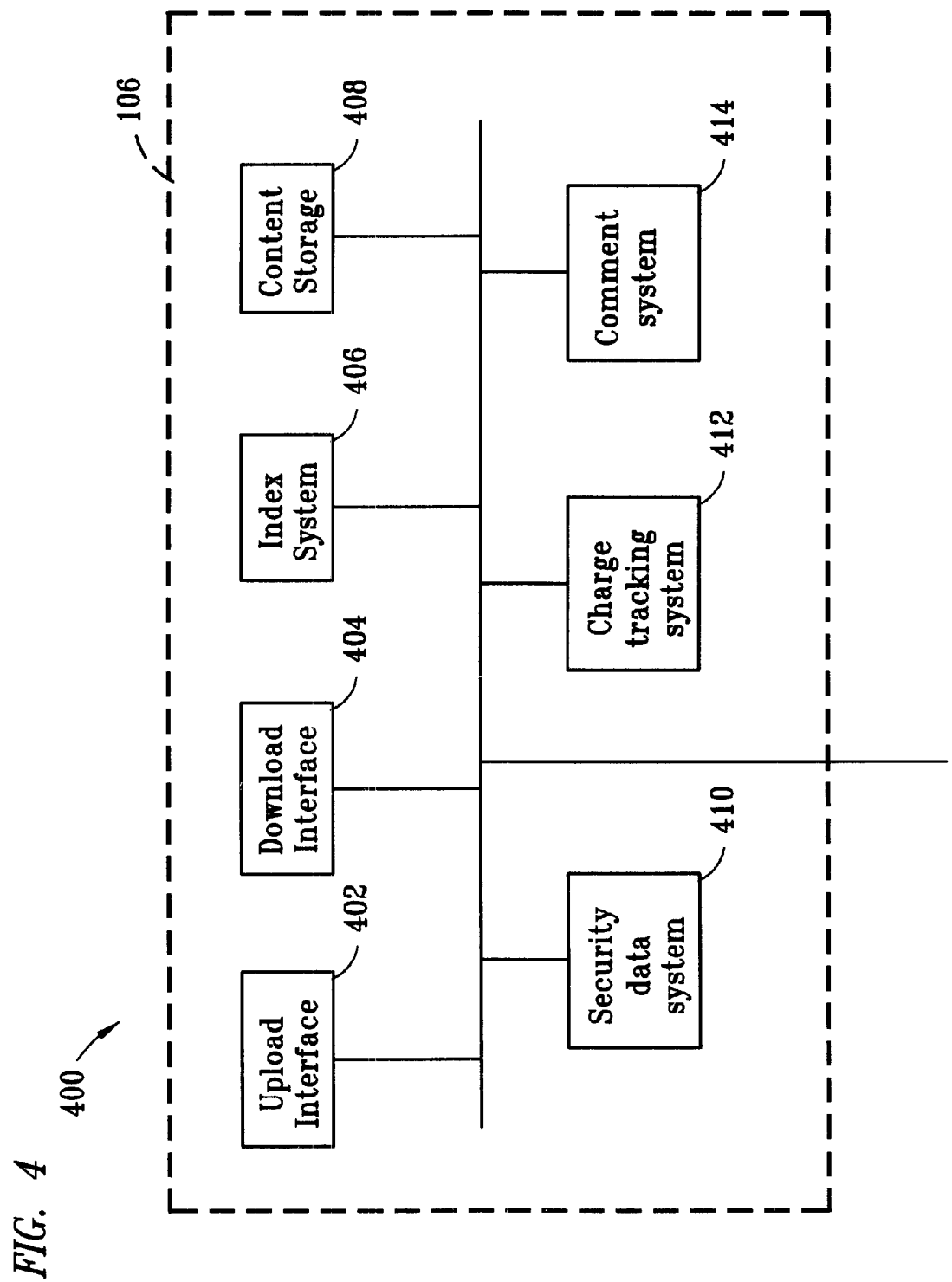
FIG. 4 is a diagram of a file content management system in accordance with an exemplary embodiment of the present invention.

FIG. 4 is a diagram of a file content management system 400 in accordance with an exemplary embodiment of the present invention. File content management system 400 includes file content management system 106 and additional system functionality. Upload interface 402, download interface 404, index system 406, security data system 410, charge tracking system 412, and comment system 414 may each be implemented in hardware, software, or a suitable combination of hardware and software. Upload interface 402, download interface 404, index system 406, content storage 408, security data system 410, charge tracking system 412, and comment system 414 are coupled through a suitable connection, such as an operating system of the computing platform on which the systems operate.

Upload interface 402 may be operable to interface with upload client 102 so as to receive file content from upload client 102. For example, upload interface 402 may transmit HTML code to upload client 102, and may receive user-generated commands in response to execution of the HTML code so as to allow the user to transmit file content to file content management system 400. In this exemplary embodiment, upload interface 402 may receive a file containing one or more data structures, and may separate the file into individual data structures. Upload interface 402 may furthermore extract index data from the files such as by recognizing data contained in the file or by other suitable methods.

Download interface 404 may be operable to interface with index system 406 and content storage 408 so as to identify data structures matching user-entered criteria. Download interface 404 is also operable to interface with download client 104, such as by transmitting HTML code to download client 104 that will be executed by a web browser software system of download client 104. Download interface 404 may then receive queries generated by the user of download client 104, and may use these queries to search index system 406 so as to identify data structures stored in file content storage 408.

Index system 406 6 may be operable to store data structures in a repository or structured storage so that data structures having predetermined content may be identified in response to queries received from a user of download client 104. For example, index system 406 may be a two dimensional database having a plurality of fields, where the fields include address fields for the address of the data structure, index data for each data structure, thumbnail image fields that contain the addresses of stored thumbnail images corresponding to each data structure, security data indicating a security access level that must be met or exceeded in order to access the data structure, and other suitable index data.

Content storage 408 may be implemented in hardware or a suitable combination of hardware and software, and may be a suitable data storage medium such as a hard drive, an optical storage medium, a zip drive, a tape drive, or other suitable content storage media. Security data system 410 may be operable to prevent a user with insufficient security access from accessing, modifying, creating, downloading, or uploading file content. For example, security data system 410 may be used to verify that a security data structure is authorized for transmission to the user requesting the data structure before it is transmitted to the user.

Charge tracking system 412 may be operable to track charges associated with downloading and uploading of data structures. For example, charge tracking system 412 may track charges assessed against users of download client 104 when they download data structures, and may also be used to track credits given to users of upload client 102 when they store data structures. Charge tracking system 412 may be operable to perform suitable charge tracking functions, such as adjusting charges based upon user identification, frequency of download, or other suitable charge tracking criteria.

Comment system 414 may be operable to receive comments from a user of upload client 102 for storage in index system 406. For example, a user of upload client 102 may use upload interface 402 to receive a file containing one or more data structures. Comment system 414 may prompt the user of upload client 102 to enter keywords for each data structure or for a group of data structures. Comment system 414 then interfaces with upload interface 402 and index system 406 to store the comments in a relational database associated with each data structure.

In operation, file content management system 400 may be used to control access to file content by upload clients 102 and download clients 104. File content management system 400 allows data structures to be uploaded and automatically indexed, and also allows charge tracking and security control of data structures. Users of download client 104 may also access file content management system 400 to download data structures, and to locate data structures by searching index data associated with each data structure. Charges for each downloaded data structure may be tracked and credited toward users of upload client 102.

Figure 5:
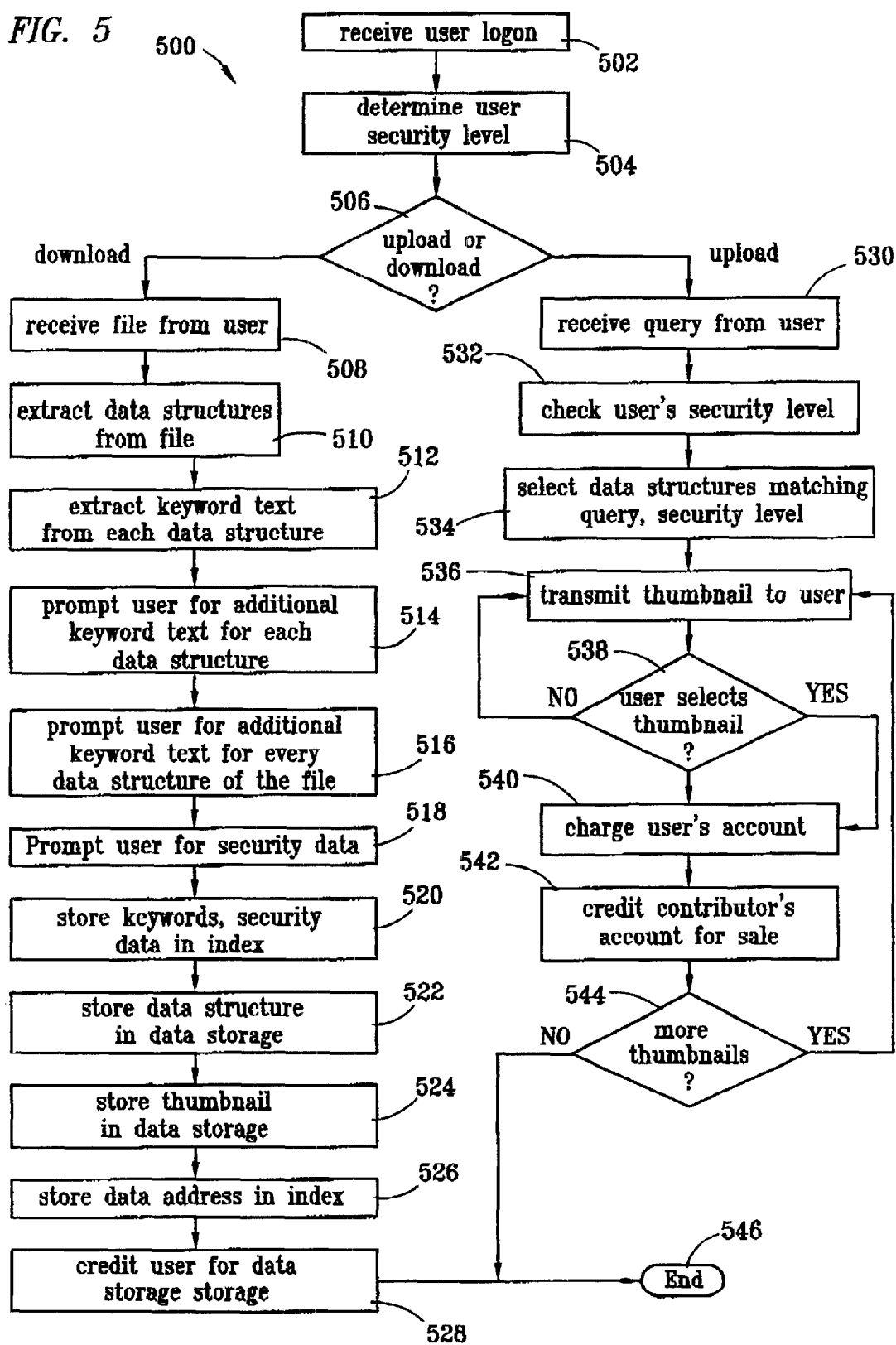
FIG. 5 is a flow chart of a method for managing file content in accordance with an exemplary embodiment of the present invention.

FIG. 5 is a flow chart of a method 500 for managing file content in accordance with an exemplary embodiment of the present invention. Method 500 may be used in conjunction with system 100 or with other suitable systems or components.

Method 500 begins at 502 where a user logon is received. For example, HTML code may be transmitted to the user that is executed by a web browser application and prompts the user to enter a user ID and password if the user has previously registered. Alternatively, if the user is not registered, the user may be prompted to select a user ID and password and to provide other suitable identifying data, which may be stored for future reference. The method then proceeds to 504.

At 504, the security level of the user is determined. For example, security level identification data may be stored in a relational database with the user ID and password, such that when the user logs on, the security level of the user is determined. Alternatively, the security level of the user may be determined from the terminal being used by the user, or by other suitable procedures. The method then proceeds to 506.

At 506, it is determined whether a file is being downloaded from a user, or whether data structures are being uploaded to a user. If a file is being downloaded from a user then the method proceeds to 508. Otherwise, the method proceeds to 530.

At 508, a file is received from the user. For example, the file may contain one or more data structures, such as presentation slides, graphic images, web pages, other suitable content, or suitable combinations of such data structures. The method then proceeds to 510 where the data structures are extracted from the file. For example, each data structure may be extracted and stored to a buffer. Alternatively, the data structures in the file may be extracted and processed one at a time. The method then proceeds to 512 where keyword data is extracted from each data structure. For example, the data structure may be searched for predetermined data, for image data that forms recognizable text, or for other suitable data. The method then proceeds to 514.

At 514, the user is prompted to add additional keyword data for each data structure, where suitable. For example, the user may be given the option of adding additional keyword data for each data structure, for groups of data structures, or by other suitable procedures. The method then proceeds to 516 where the user is prompted for additional keyword data to be used for every data structure of the file. For example, the user may want to identify the group of data structures in the file as a single presentation, a single news story, an animation sequence of graphic images, or for other suitable purposes. After the user enters the keyword data, the method proceeds to 518.

At 518, the user is prompted for security data. For example, the user may have a first security level, but may be entering file content for viewing by persons having a lower security level. Likewise, the user may want to designate the file content accessible for any user, for predetermined users, or for other suitable classes of users. After security data has been received at 518, the method proceeds to 520.

At 520, the extracted keyword data, additional data structure and file index data, and security data are stored in an index. For example, the index may have a suitable number of predetermined fields for storing information that may be searched to located each data structure, such as user identification fields to identify the user that entered the file content, date fields, time fields, fields for index data extracted from the data structure, fields for index data added by the users, and additional suitable fields. The method then proceeds to 522.

At 522, the data structure is stored in a data storage medium, such as a hard drive, a tape drive, an optical storage medium, random access memory, or other suitable data storage media. The method then proceeds to 524 where thumbnail data is stored in the data storage medium. For example, a thumbnail image may be a low resolution and small size image that is used to allow users seeking access to the data structure to view an example of the data structure without providing a useable version of the data structure. The method then proceeds to 526.

At 526, the data structure address is stored in the index. For example, the index may be kept on a first data storage device and data structure storage may be kept on one or more additional data storage devices. Likewise, the thumbnail data may be stored in another data storage device. A storage device identifier and address may be stored in a relational database so that index data may be correlated to a thumbnail image and full size image. The method then proceeds to 528.

At 528, the user is given credit for data structure storage. For example, a user may be an employee of an enterprise that gets credit for the number of data structures provided, may receive a bonus based on the number of data structures provided, may work on a commission basis, or may have other reasons for tracking the number of data structures submitted. Likewise, the user may be an author of news stories or other suitable file content, a photographer or artist creating image file content, or other suitable file content creators. The users may likewise be prompted to enter an asking price for each data structure at 528. The method then proceeds to 546 and terminates. Alternatively, the method may return to 512 if data structures are processed one at a time.

If it is determined at 506 that download has been requested by the user, the method proceeds to 530. At 530, a query is received from the user. For example, the user may enter one or more keywords, date fields, author identifiers, or other suitable data in order to identify data structures that correspond to the query. The method then proceeds to 532 where the user's security level is determined. The method then proceeds to 534 where data structures are selected that match the query and the security level of the user. In one exemplary embodiment, a user may enter "merger" and "acquisition" as keywords, but may not have suitable security clearance to view merger and acquisition data for the enterprise. Method 500 would prohibit the user from receiving merger and acquisition data for the enterprise, but would allow the user to receive other data structures related to mergers and acquisitions and which has a suitable security level. The method then proceeds to 536.

At 536 a thumbnail of a selected data structure is transmitted to the user. For example, the user may receive a number of "hits" in response to their query, and may then be presented with a suitable number of thumbnails to allow the user to review the hits and make selections of data structures. After the thumbnail is transmitted to the user at 536, the method proceeds to 538 where it is determined whether the user has selected a thumbnail. If the user has not selected a thumbnail, the method returns to 536 where additional thumbnails are transmitted to the user. If the user does select a thumbnail, the method proceeds to 540.

At 540 the user's account is charged for the data structures that have been ordered, and the data structures are transmitted to the user. The method then proceeds to 542 where the contributor's account is credited for the sale. The method then proceeds to 544. At 544, it is determined whether additional thumbnails remain that are responsive to the user's query. If additional thumbnails remain, the method returns to 536. Otherwise, the method proceeds to 546 and terminates.

In operation, method 500 is used to allow users to access a file content management system. A user may elect to store or download file content, and other users may elect to search the downloaded data structures and upload selected data structures for use by the viewer. In this manner, file content creators or authors may be matched with users in a manner that allows the users to identify desired data structures quickly and efficiently. Method 500 may be used to assemble slide presentation pages, to assemble pages for website content, to select images, or for other suitable purposes.

Although preferred and exemplary embodiments of a system and method for managing file content have been described in detail herein, those skilled in the art will also recognize that various substitutions and modifications may be made to the systems and methods without departing from the scope and spirit of the appended claims.

What is claimed is:

1. A system for managing file content comprising:
   a download interface operable to receive one or more data structures from an upload client and to extract index data from each data structure;
   an index system coupled to the download interface, wherein the index system is operable to receive the index data from the download interface and to store the index data;
   a content storage system coupled to the download interface and the index system, the content storage system operable to receive data structures for storage from the download interface system, and to provide a storage address to the index system; and
   an upload interface coupled to the index system and the content storage system, the upload interface operable to receive a query from an upload client, to identify data structures matching the query, and to upload the data structures to the upload client.

2. The system of claim 1 wherein the data structures are presentation slide data pages.

3. The system of claim 1 wherein the data structures are Internet web pages.

4. The system of claim 1 wherein the data structures are image data files.

5. The system of claim 1 further comprising a comment system, wherein the comment system is operable to receive user-entered index data that is associated with each data structure.

6. The system of claim 1 further comprising a security data system coupled to the upload interface, the security data system operable to determine whether the upload user should be granted access to each data structure based upon security data associated with each data structure and user security data associated with the upload user.

7. The system of claim 1 further comprising a charge tracking system coupled to the upload interface, the charge tracking system operable to store charge data for the upload client based upon the data structures uploaded by the client.

8. A system for managing file content comprising:
   a file upload system coupled to a communications medium, the file upload system operable to transfer one or ore files over the communication medium;
   a file content management system coupled to the communications medium, the file content management system operable to receive the one or more files from the file upload system, to extract one or more data structures from each file, to extract index data from each data structure, and to store the index data and each data structure in a relational database; and
   a data structure download system coupled to the communications medium, the data structure download system operable to query the file content management system and to receive one or more data structures in response to the query.

9. The system of claim 8 wherein the file upload system further comprises:
   a content editor operable to create a file and to modify the file;
   a content storage coupled to the content editor, the content editor operable to store and retrieve one or more files from the content storage; and an upload interface coupled to the content storage, the upload interface operable to retrieve one or more files from the content storage and to transmit the files over the communications medium.

10. The system of claim 9 wherein the upload interface is a software system that is transmitted to the file upload system by the file content management system.

11. The system of claim 8 wherein the data structure download system further comprises:

a content viewer operable to view a data structure;

content storage coupled to the content viewer, the content viewer operable to store and retrieve one or more data structures from the content storage; and a download interface coupled to the content viewer, the download interface operable to receive the data structure from the communications medium and to transfer the data structure to the content viewer.

12. The system of claim 10 wherein the download interface is a software system that is transmitted to the data structure download system by the file content management system.

13. A method for managing file content comprising:

receiving one or more files;

extracting one or more data structures from each file;

storing extracted index data for each data structure in an index;

storing each data structure in a data storage that is cross-referenced with the index; and searching the index to identify data structures matching user-entered data strings.

14. The method of claim 13 wherein receiving one or more files comprises receiving a file containing one or more presentation slide pages.

15. The method of claim 13 wherein receiving one or files further comprises receiving security data associated with each of the one or more files.

16. The method of claim 13 wherein extracting data from each file further comprises receiving user-entered data for each file.

17. The method of claim 13 wherein receiving one or more files comprises receiving a file containing one or more web pages.

18. The method of claim 13 wherein searching the index to identify data structures matching user-entered data strings further comprises:

receiving security data associated with the user; and excluding data structures from the search results based upon the security data.

19. The method of claim 13 further comprising:

presenting a thumbnail of the data structure to the user;

receiving selection data from the user; and storing charge data based upon the selection data.

20. The method of claim 19 further comprising storing credit data for a data structure author based upon the selection data.

* * * * *